May 28, 1946. W. R. GAMBLE 2,401,237
BOOSTER PRESSURE RELIEF VALVE
Filed June 9, 1944

Inventor
WILLIAM RICHARD GAMBLE,

By Clarence A. O'Brien
and Harvey B. Jacobson
Attorneys

Patented May 28, 1946

2,401,237

UNITED STATES PATENT OFFICE 2,401,237

BOOSTER PRESSURE RELIEF VALVE

William Richard Gamble, Los Angeles, Calif.

Application June 9, 1944, Serial No. 539,571

1 Claim. (Cl. 137—53)

This invention relates to new and useful improvements in booster pressure relief valves, the principal object being to provide a valve constructed in such a manner as to provide more surface exposed to pressure to thereby afford greater assurance of the positive operation of the valve than present valves now in general use.

Another important object of the invention is to provide a booster pressure relief valve employing dual valve parts consisting of a small valve and a large valve, the large valve functioning to quickly open the small valve when pressure begins to exert itself thereon.

Other objects and advantages of the invention will become apparent to the reader of the following description.

Figure 1:
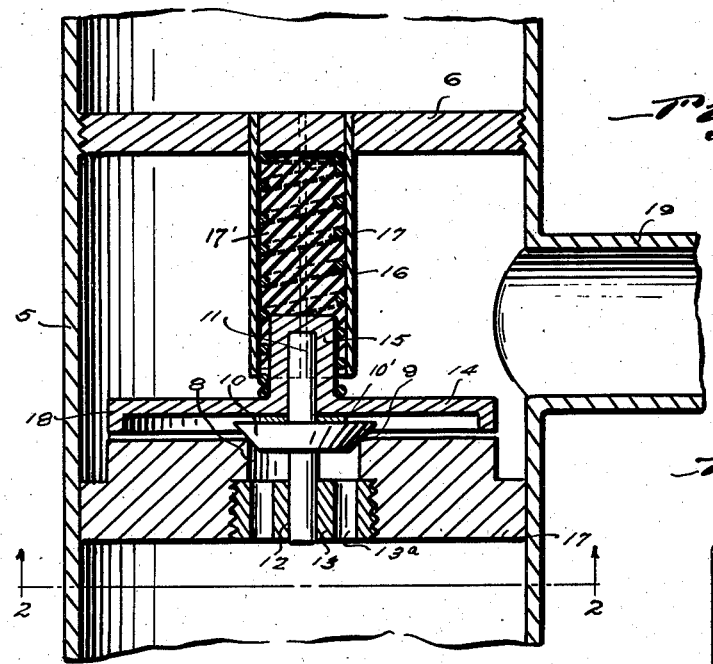
Figure 1 is a fragmentary vertical sectional view through the valve structure.
Figure 3:
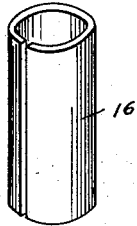
Figure 3 is a perspective view of one of the important details of the complete assemblage.
Figure 2:
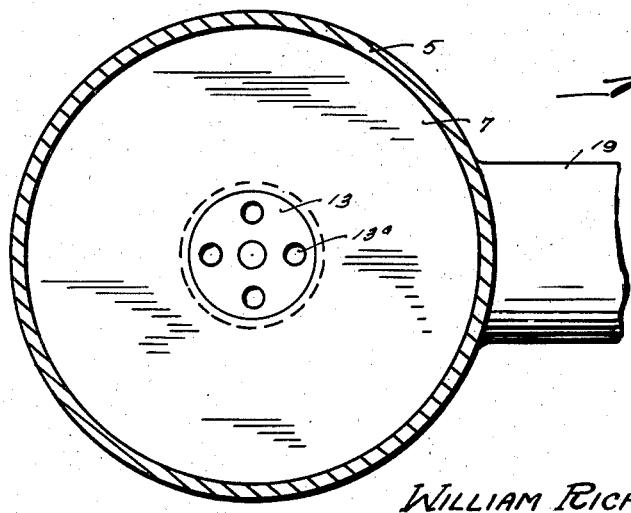
Figure 2 is a cross sectional view taken substantially on the line 2—2 of Figure 1.

Referring to the drawing wherein like numerals designate like parts, it can be seen that numeral 5 denotes a cylinder blocked off by a cross partition 6 which is preferably threaded into place.

Spaced from the cross partition 6 is a second and thicker cross partition 7 having an opening 8 therethrough, the upper portion of the partition 7 at the opening 8 defining a seat 9 for a poppet valve 10. The valve 10 has an upwardly and downwardly disposed stem 11, the lower end of which slides in a bore 12 in a threaded plug 13 which is threadedly disposed in the lower portion of the cross partition 7 at the opening 8.

Numeral 14 denotes a large valve having an upwardly disposed burr 15 formed with a recess for receiving the upper end of the valve stem 11.

A split cylindrical shield 16 extends downwardly from the cross partition 6 and in this is a coiled compression spring 17 interposed between the cross partition 6 and the top of the large valve 14 and it is preferable that this spring be embedded in neoprene or some other pliable rubber or rubber-like material 17'.

The large valve 14 has a depending peripheral skirt 18 opposed to the top of the partition 7. A release duct 19 communicates with the cylinder or pipe 5 between the partitions 6, 7.

In the operation of this valve, the large valve 14 remains slightly open at all times and the amount of this opening may depend upon the material and flow desired. As the poppet valve 10 closes the large valve acts as a bleeder and closes gently and effectively.

The amount the large valve 14 is left open can be regulated by the presence of one or more shims 10' interposed between the poppet valve 10 and the large valve 14.

This booster valve is used most commonly with fine oil, but obviously anything fluent can be employed with this valve.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a booster valve, a vertical cylinder, upper and lower partitions in said cylinder, the upper partition being threaded to the cylinder, said cylinder having an outlet at a side of a chamber defined by the partitions, the lower portition being formed with a center opening having a valve seat about its upper end and a spider in the lower portion of said opening, a poppet valve normally seated upon said valve seat and having a central stem extending upwardly and downwardly from the poppet valve with its lower portion slidably passing through said spider, a disc-valve of appreciably greater diameter than said poppet valve resting upon the poppet valve and having a depending marginal flange, an upstanding neck at the center of the disc-valve formed with a socket slidably receiving the stem of the poppet valve, a split sleeve mounted vertically and attached to the center of the upper partition and extending downwardly therefrom with its lower portion surrounding said neck, a helical spring in said sleeve embedded in a mass of pliable rubber fitting tightly in the sleeve, and said spring having its lower portion surrounding said neck and abutting the disc-valve to urge both valves downwardly and yieldably hold the poppet valve against the valve seat.

WILLIAM RICHARD GAMBLE.